(12) United States Patent
Hoang et al.

(10) Patent No.: US 10,640,962 B2
(45) Date of Patent: May 5, 2020

(54) METHOD AND APPARATUS FOR CONTROLLING A WASTE OUTLET OF A TOILET

(71) Applicant: B/E Aerospace, Inc., Winston-Salem, NC (US)

(72) Inventors: Thao Hoang, Rockford, IL (US); Bradley J. Buniak, Schaumburg, IL (US); Christian C. Kurshinsky, Rockford, IL (US); Stephen M. Niznik, Rockford, IL (US); William Pedersen, Winston-Salem, NC (US); Mark A. Pondelick, Rockton, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/272,747

(22) Filed: Feb. 11, 2019

(65) Prior Publication Data
US 2019/0277014 A1    Sep. 12, 2019

Related U.S. Application Data

(62) Division of application No. 15/084,078, filed on Mar. 29, 2016, now Pat. No. 10,202,747.
(Continued)

(51) Int. Cl.
*E03D 9/00*   (2006.01)
*E03D 11/16*  (2006.01)
(Continued)

(52) U.S. Cl.
CPC .............. *E03D 9/00* (2013.01); *B64D 11/02* (2013.01); *E03D 5/012* (2013.01); *E03D 5/02* (2013.01);
(Continued)

(58) Field of Classification Search
CPC ...................................................... E03D 9/00
(Continued)

(56) References Cited

U.S. PATENT DOCUMENTS

| 344,777 A | 6/1886 | Griswold |
| 2,680,714 A | 6/1954 | Carlsson et al. |

(Continued)

FOREIGN PATENT DOCUMENTS

| CH | 567956 A5 | 10/1975 |
| CN | 201067373 Y | 6/2008 |

(Continued)

OTHER PUBLICATIONS

Ex Parte Quayle Action for U.S. Office Action on U.S. Appl. No. 15/084,257 dated Sep. 27, 2017. 7 pages.
(Continued)

*Primary Examiner* — Christine J Skubinna
(74) *Attorney, Agent, or Firm* — Donna P. Suchy

(57) ABSTRACT

An apparatus for controlling the waste outlet of a toilet includes, according to an implementation, a motor comprising a Hall effect sensor that detects the rotation of the motor and generates a position signal in response thereto; a mechanical actuator coupled to the motor; a door coupled to the mechanical actuator, wherein the door is disposed at the waste outlet of the toilet; logic circuitry that receives the position signal, generates a control signal to move the door based at least in part on the position signal, and transmits the control signal to the motor. The motor operates according to the control signal to drive the mechanical actuator to move the door.

14 Claims, 6 Drawing Sheets

Related U.S. Application Data

(60) Provisional application No. 62/140,260, filed on Mar. 30, 2015.

(51) Int. Cl.

| | |
|---|---|
| *E03F 1/00* | (2006.01) |
| *B64D 11/02* | (2006.01) |
| *E03D 11/13* | (2006.01) |
| *E03D 5/10* | (2006.01) |
| *E03D 5/012* | (2006.01) |
| *F16K 3/04* | (2006.01) |
| *F16K 31/04* | (2006.01) |
| *F16K 31/46* | (2006.01) |
| *E03D 5/02* | (2006.01) |

(52) U.S. Cl.
 CPC .............. *E03D 5/10* (2013.01); *E03D 11/13* (2013.01); *E03D 11/135* (2013.01); *E03D 11/16* (2013.01); *E03F 1/006* (2013.01); *F16K 3/04* (2013.01); *F16K 31/047* (2013.01); *F16K 31/465* (2013.01)

(58) Field of Classification Search
 USPC .......................................................... 4/434
 See application file for complete search history.

(56) References Cited

U.S. PATENT DOCUMENTS

| | | |
|---|---|---|
| 2,708,033 A | 5/1955 | Thomas |
| 2,878,829 A | 3/1959 | Folmsbee |
| 3,411,162 A | 11/1968 | Palmer |
| 3,510,099 A | 5/1970 | Crump |
| 3,616,617 A | 11/1971 | Groote |
| 3,719,957 A | 3/1973 | Riedel |
| 3,722,850 A | 3/1973 | Kemper |
| 3,835,479 A | 9/1974 | Milette et al. |
| 3,860,973 A | 1/1975 | Uyeda et al. |
| 3,902,876 A | 9/1975 | Moen et al. |
| 3,939,500 A | 2/1976 | Miller et al. |
| 3,995,328 A | 12/1976 | Carolan et al. |
| 4,041,554 A | 8/1977 | Gregory et al. |
| 4,237,934 A | 12/1980 | Gregory et al. |
| 4,289,611 A | 9/1981 | Brockmann |
| 4,376,314 A | 3/1983 | Iwans |
| 4,438,781 A | 3/1984 | Brenholt |
| 4,469,497 A | 9/1984 | Linhardt |
| 4,511,117 A | 4/1985 | Soderstrom |
| 4,546,502 A | 10/1985 | Lew |
| 4,601,210 A | 7/1986 | Brown |
| 4,612,120 A | 9/1986 | Box |
| 4,635,901 A | 1/1987 | Pond |
| 4,713,847 A | 12/1987 | Oldfelt et al. |
| 4,783,859 A | 11/1988 | Rozenblatt et al. |
| 4,811,754 A | 3/1989 | Wilhelm |
| 4,968,325 A | 11/1990 | Black et al. |
| 5,007,117 A | 4/1991 | Oldfelt et al. |
| 5,035,011 A | 7/1991 | Rozenblatt |
| 5,048,130 A | 9/1991 | Brotman et al. |
| 5,065,786 A | 11/1991 | Rozenblatt |
| 5,099,867 A | 3/1992 | Emery |
| 5,142,712 A | 9/1992 | Hennessy |
| 5,187,818 A | 2/1993 | Barrett et al. |
| 5,231,706 A | 8/1993 | Kendall |
| 5,271,105 A | 12/1993 | Tyler |
| 5,317,763 A | 6/1994 | Frank et al. |
| 5,326,069 A | 7/1994 | Clear et al. |
| 5,344,085 A | 9/1994 | Hofseth |
| 5,372,710 A | 12/1994 | Frank |
| 5,464,191 A | 11/1995 | Shenk |
| 5,515,554 A | 5/1996 | Clear et al. |
| 5,535,770 A | 7/1996 | Nurmi |
| 5,604,938 A | 2/1997 | Tyler |
| 5,625,905 A | 5/1997 | Woods |
| 5,707,027 A | 1/1998 | Hiesener |
| 5,754,987 A | 5/1998 | Johansson et al. |
| 5,813,061 A | 9/1998 | Tornqist |
| 5,873,135 A | 2/1999 | Tornqvist |
| 5,909,968 A | 6/1999 | Olin et al. |
| 5,956,780 A | 9/1999 | Tyler |
| 6,085,366 A | 7/2000 | Pondelick et al. |
| 6,131,596 A | 10/2000 | Monson |
| 6,148,860 A | 11/2000 | Sigler |
| 6,152,160 A | 11/2000 | Bowden Wilcox et al. |
| 6,186,162 B1 | 2/2001 | Purvis et al. |
| 6,202,683 B1 | 3/2001 | Smith |
| 6,212,700 B1 | 4/2001 | Giesler et al. |
| 6,223,357 B1 | 5/2001 | Claas |
| 6,226,807 B1 | 5/2001 | Rozenblatt et al. |
| 6,240,575 B1 | 6/2001 | Polo Sanchez |
| 6,325,356 B1 | 12/2001 | Rozenblatt |
| 6,347,416 B1 | 2/2002 | Anderson et al. |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,370,709 B1 | 4/2002 | Stradinger et al. |
| 6,394,122 B1 | 5/2002 | Sibley et al. |
| 6,402,799 B1 | 6/2002 | Kokubo et al. |
| 6,453,481 B1 | 9/2002 | Pondelick et al. |
| 6,484,743 B2 | 11/2002 | Bauckman |
| 6,502,278 B2 | 1/2003 | Oh et al. |
| 6,513,174 B1 | 2/2003 | Johansson |
| 6,536,054 B2 | 3/2003 | Anderson et al. |
| 6,536,055 B2 | 3/2003 | Pondelick et al. |
| 6,546,593 B2 | 4/2003 | Oh et al. |
| 6,575,425 B1 | 6/2003 | Betz |
| 6,648,002 B2 | 11/2003 | Lappalainen |
| 6,704,947 B2 | 3/2004 | Stradinger et al. |
| 6,729,368 B2 | 5/2004 | Nguyen |
| 6,732,386 B2 | 5/2004 | Anderson et al. |
| 6,748,973 B2 | 6/2004 | Lindroos |
| 6,763,531 B1 | 7/2004 | Huffman et al. |
| 6,883,188 B2 | 4/2005 | Sigler et al. |
| 6,932,297 B2 | 8/2005 | Steindl et al. |
| 6,977,005 B2 | 12/2005 | Erdmann et al. |
| 6,981,285 B2 | 1/2006 | Sigler et al. |
| 7,118,677 B2 | 10/2006 | Hoffjann et al. |
| 7,127,749 B2 | 10/2006 | Ling |
| 7,156,363 B2 | 1/2007 | Parsons et al. |
| 7,169,305 B2 | 1/2007 | Gomez |
| 7,188,822 B2 | 3/2007 | Marcichow |
| 7,331,365 B2 | 2/2008 | Nguyen |
| 7,690,053 B2 | 4/2010 | Pondelick |
| 7,921,478 B1 | 4/2011 | Vanini |
| 8,266,731 B2 | 9/2012 | Marra |
| 8,607,370 B2 | 12/2013 | Hoang et al. |
| 8,613,115 B2 | 12/2013 | Seibt et al. |
| 8,769,731 B2 | 7/2014 | Seibt |
| 8,887,320 B2 | 11/2014 | Dezarn et al. |
| 9,371,136 B2 | 6/2016 | Beach et al. |
| 2001/0034902 A1 | 11/2001 | Tyler |
| 2002/0069459 A1 | 6/2002 | Pondelick et al. |
| 2002/0145080 A1 | 10/2002 | Renken et al. |
| 2005/0173336 A1 | 8/2005 | Arnaud |
| 2006/0075546 A1 | 4/2006 | Sigler |
| 2006/0096015 A1 | 5/2006 | Lim |
| 2007/0079432 A1 | 4/2007 | Shoikhet et al. |
| 2007/0204391 A1 | 9/2007 | Marra |
| 2007/0226887 A1 | 10/2007 | Lappalainen et al. |
| 2007/0297894 A1 | 12/2007 | Dandasi et al. |
| 2008/0185477 A1 | 8/2008 | Seibt |
| 2010/0083433 A1 | 4/2010 | Pondelick et al. |
| 2010/0083435 A1 | 4/2010 | Hoang et al. |
| 2011/0107506 A1 | 5/2011 | Nasrallah |
| 2011/0173743 A1 | 7/2011 | Jensen et al. |
| 2012/0066824 A1 | 3/2012 | Dezarn et al. |
| 2014/0041109 A1 | 2/2014 | Stauber et al. |
| 2014/0101837 A1 | 4/2014 | Boodaghians et al. |
| 2014/0137319 A1 | 5/2014 | Beach et al. |
| 2014/0208498 A1 | 7/2014 | Beach et al. |
| 2014/0223655 A1 | 8/2014 | Dillard |

(56) References Cited

U.S. PATENT DOCUMENTS

| | | |
|---|---|---|
| 2014/0259343 A1 | 9/2014 | Wilson et al. |
| 2015/0013058 A1 | 1/2015 | Bucher et al. |
| 2019/0307300 A1 | 10/2019 | Smith |

FOREIGN PATENT DOCUMENTS

| | | |
|---|---|---|
| CN | 102171401 A | 8/2011 |
| CN | 204037764 U | 12/2014 |
| CN | 104334452 A | 2/2015 |
| EP | 1 818 462 | 8/2007 |
| EP | 2 050 882 | 9/2015 |
| JP | 4835303 B2 | 12/2011 |
| WO | WO-02/06594 A1 | 1/2002 |
| WO | WO-2008/015070 | 1/2008 |
| WO | WO-2008/042728 A1 | 4/2008 |
| WO | WO-2012/146632 A1 | 11/2012 |
| WO | WO-2014/081912 A2 | 5/2014 |
| WO | WO-2014/120878 A1 | 8/2014 |

OTHER PUBLICATIONS

Extended European Search Report in European Patent Application No. 16774058.8 dated Nov. 14, 2018. 11 pages.
Final Office Action for U.S. Appl. No. 15/084,185 dated Oct. 20, 2017. 12 pages.
Final Office Action on U.S. Appl. No. 15/084,317 dated May 7, 2018.
International Search Report and Written Opinion for PCT/US2016/024963, dated Aug. 16, 2016. 11 pages.
International Search Report and Written Opinion for PCT/US2016/024888, dated Aug. 2016, 10 pages.
International Search Report and Written Opinion for PCT/US2016/024909, dated Jun. 10, 2016, 7 pages.
International Search Report and Written Opinion for PCT/US2016/024936, dated Jun. 16, 2016, 6 pages.
International Search Report and Written Opinion for PCT/US2016/024983, dated Jun. 17, 2016, 9 pages.
Jaromir Jezny et al: "Position Measurement with Hall Effect Sensors", American Journal of Mechanical Engineering (Nov. 1, 2013) pp. 231-235.
Non-Final Office Action for U.S. Appl. No. 15/084,078, dated Jan. 5, 2018, 8 pages.
Non-Final Office Action for U.S. Appl. No. 15/084,317 dated Sep. 27, 2017. 8 pages.
Non-Final Office Action for U.S. Appl. No. 15/084,358 dated Sep. 27, 2017. 10 pages.
Non-Final Office Action on U.S. Appl. No. 15/084,185 dated Apr. 7, 2017, 14 pages.
Non-Final Office Action on U.S. Appl. No. 15/084,185 dated Jun. 22, 2018. 8 pages.
Office Action on EP Application No. 16774085.1 dated Nov. 19, 2018. 9 pages.
Office Action on European Patent Application No. 16774064.6 dated Nov. 15, 2018. 8 pages.
Office Action on European Patent Application No. 16774075.2 dated Nov. 15, 2018. 7 pages.
Extended European Search Report on EP Application No. 16774095 dated Mar. 14, 2019. 3 pages.

METHOD AND APPARATUS FOR CONTROLLING A WASTE OUTLET OF A TOILET

CROSS REFERENCES TO RELATED APPLICATIONS

This application is a divisional of U.S. patent application Ser. No. 15/084,078, filed Mar. 29, 2016, which claims the benefit of U.S. Provisional Application No. 62/140,260, filed on Mar. 30, 2015, both of which are incorporated herein by reference in their entirety.

FIELD OF THE DISCLOSURE

The present disclosure is relates generally to toilets and, more particularly, a method and apparatus for controlling a waste outlet of a toilet.

BACKGROUND

Designing a toilet for an aircraft poses challenges that do not generally occur in ground-based toilet designs. For example, in an aircraft, space and weight are at a premium, and using regular water-flush toilets is not practical. Also, treating malfunctions such as clogs is much more difficult, since space restrictions make access to plumbing nearly impossible.

DRAWINGS

While the appended claims set forth the features of the present techniques with particularity, these techniques may be best understood from the following detailed description taken in conjunction with the accompanying drawings of which:

Figure 1:
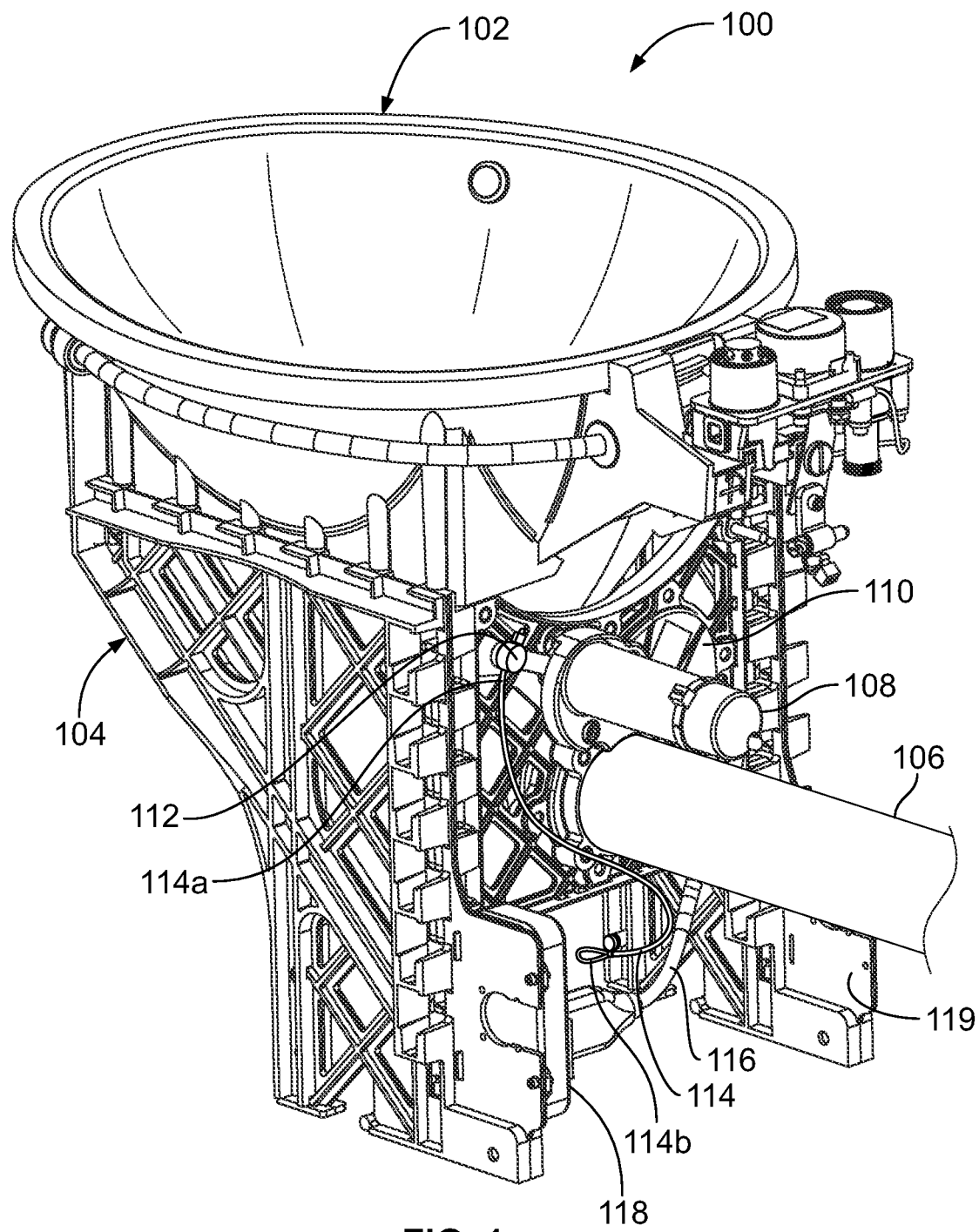
FIG. 1 is a perspective view of a toilet configured according to an embodiment.
Figure 4A:
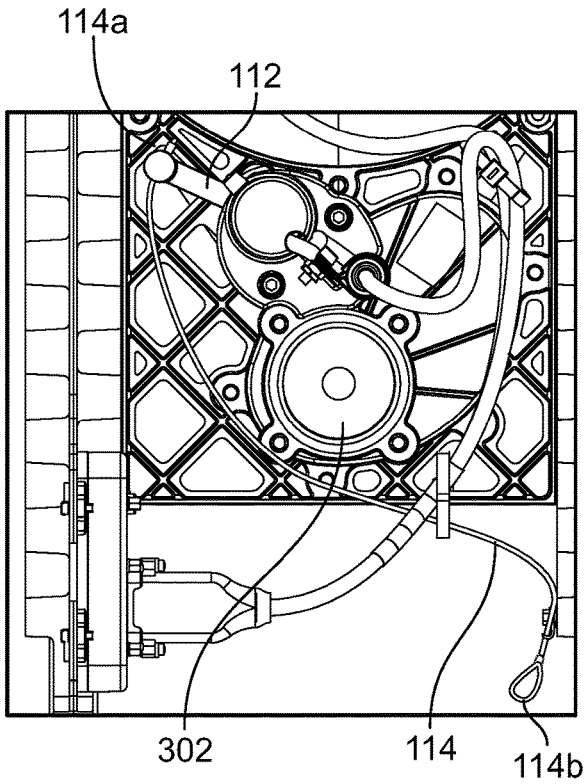
Figure 4B:
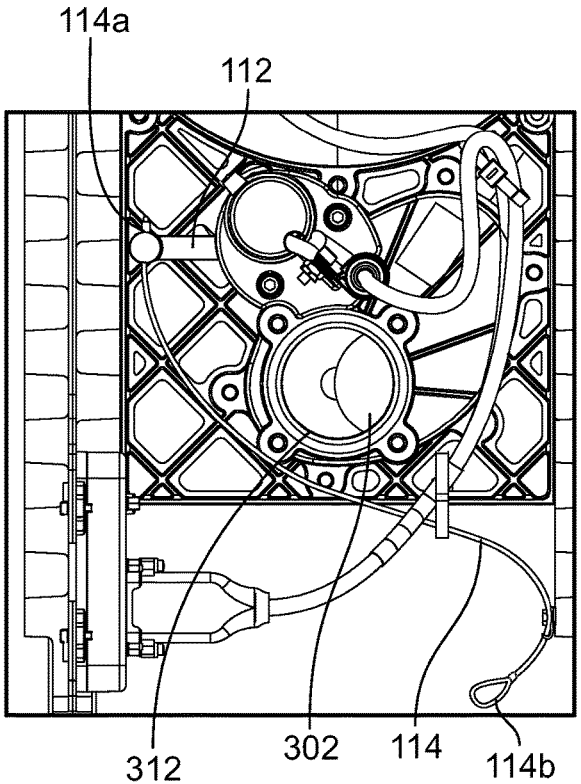
Figure 4C:
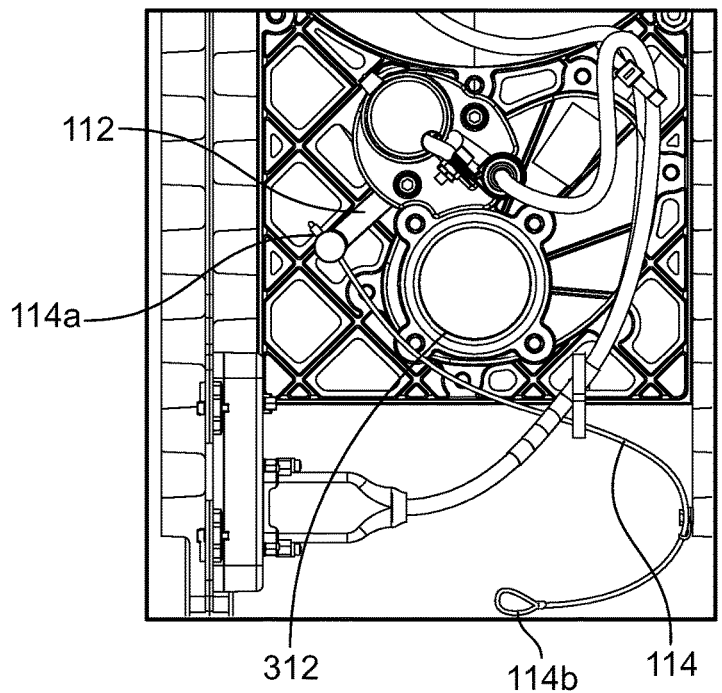

FIGS. 4A, 4B, and 4C are back side elevation views of the toilet of FIG. 1, with the waste pipe removed, according to an embodiment.

Figure 5:
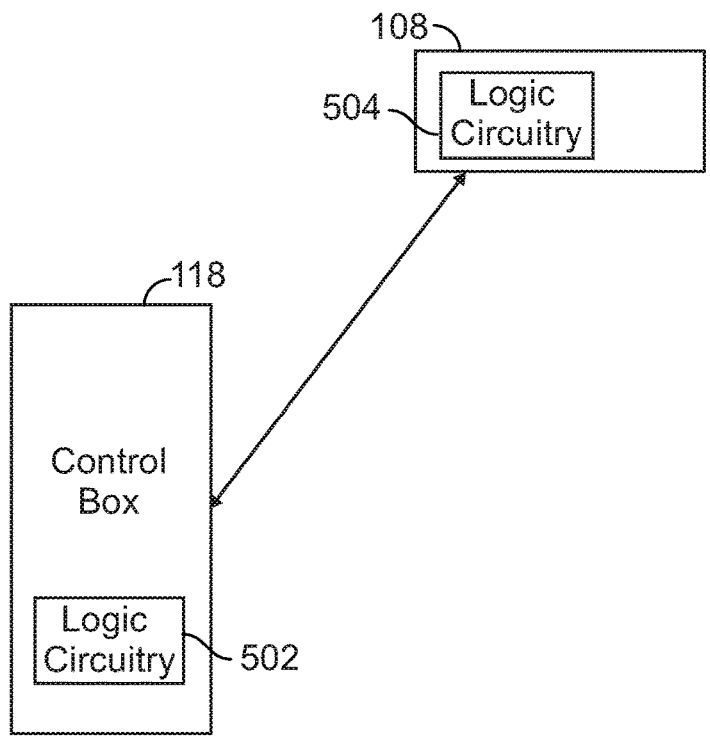

FIG. 5 is a block diagram depicting logic circuitry that may be used in an embodiment.

Figure 6:
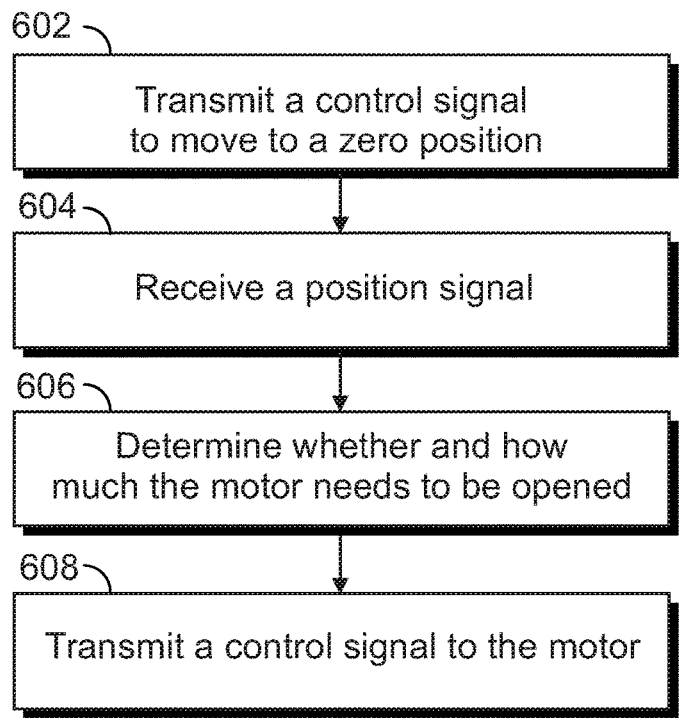

FIG. 6 is a flow diagram depicted a process that may be carried out in an embodiment.

FIGS. 7A, 7B, 7C, and 8 are back views of the toilet of FIG. 1 showing particular features, according to an embodiment.

DETAILED DESCRIPTION

The following discussion is directed to various exemplary embodiments. However, one possessing ordinary skill in the art will understand that the examples disclosed herein have broad application, and that the discussion of any embodiment is meant only be exemplary of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

The disclosure is generally directed to a method and apparatus for controlling a waste outlet of a toilet. According to an embodiment, the apparatus includes a motor having a Hall effect sensor that detects the rotation of the motor and generates a position signal in response thereto; a mechanical actuator coupled to the motor; a door coupled to the mechanical actuator, wherein the door is disposed at the waste outlet; logic circuitry that receives the position signal, generates a control signal to move the door based at least in part on the position signal, and transmits the control signal to the motor. The motor operates according to the control signal to drive the mechanical actuator to move the door.

In an embodiment, the method includes transmitting a control signal to the logic circuitry of a motor of a toilet to move the motor to a zero position; receiving a position signal from the motor; determining, based at least in part on the position signal, how much the motor needs to be operated in order to move a door at a waste outlet of the toilet to an appropriate position; and transmitting a control signal to the motor to cause the motor to drive the mechanical actuator to move the door to the appropriate position.

According to an embodiment, the apparatus includes a lever; a mechanical actuator coupled to the lever; a door coupled to the mechanical actuator, wherein the door is disposed at the waste outlet of the toilet; and a lanyard having a first end that is coupled to the lever, wherein the lanyard is manually accessible. When the lanyard is pulled, the lever moves so as to move the mechanical actuator to move the door.

The term "logic circuitry" as used herein means a circuit (a type of electronic hardware) designed to perform complex functions defined in terms of mathematical logic. Examples of logic circuitry include a microprocessor, a controller, an application-specific integrated circuit, and a field-programmable gate array.

Turning to FIG. 1, a toilet configured according to an embodiment is shown. The toilet, generally labelled 100, is configured to be deployed on an aircraft, and may be housed within an external housing (not shown). The toilet 100 includes a bowl 102 attached to a frame 104. The toilet 100 also includes a waste pipe 106 attached at the waste outlet (shown in FIG. 3) of the bowl 102 and a motor 108 attached to the frame 104. The motor 108 drives a mechanical actuator to open or close a door to the waste outlet (shown in further detail in FIGS. 4A-4C). A housing 110 is attached to the frame 104 and contains the mechanical actuator. A lever 112 is coupled to (e.g., attached to) the mechanical actuator. A lanyard 114 has a first end 114a that is coupled to the lever 112 and a second end 114b that may hang free or may be attached to a portion of the frame 104. As will be described below in further detail, the lever 112 and lanyard 114 allow the door to the waste outlet to be closed manually.

The toilet 100 further includes a control box 118 attached to the frame 104. The control box 118 contains logic circuitry that controls the operation of the toilet 100. Although depicted on the back left side of the frame 104, the control box 118 may be attached to the frame 104 at other locations, such as the back right side (e.g., location 119). A cable 116 is attached to the control box 118 and to the motor 108. The cable 116 provides a transmission medium for electrical signals to travel from the control box 118 to the motor 108 (e.g., power and data) and for electrical signals to travel from the motor 108 to the control box 118 (e.g., data). For example, the logic circuitry in the control box 118 can transmit control signals to the motor 108 by way of the cable 116, and the motor 108 can transmit position signals to the logic circuitry by way of the cable 116. During operation, the door to the waste outlet is normally closed. When the logic circuitry in the control box 118 receives an activation signal (e.g., a signal generated by a "flush" button on the toilet 100), the logic circuitry sends a control signal to the motor 108 to open the door to the waste outlet. A pressure difference between the air in the waste pipe 106 and the air around the outside of the toilet 100 creates a suction at the waste outlet, which draws the waste from inside the bowl 102 out of the waste outlet and into the waste pipe 106. After a predetermined period of time, the motor 108 drives the mechanical actuator to close the door.

Figure 2:
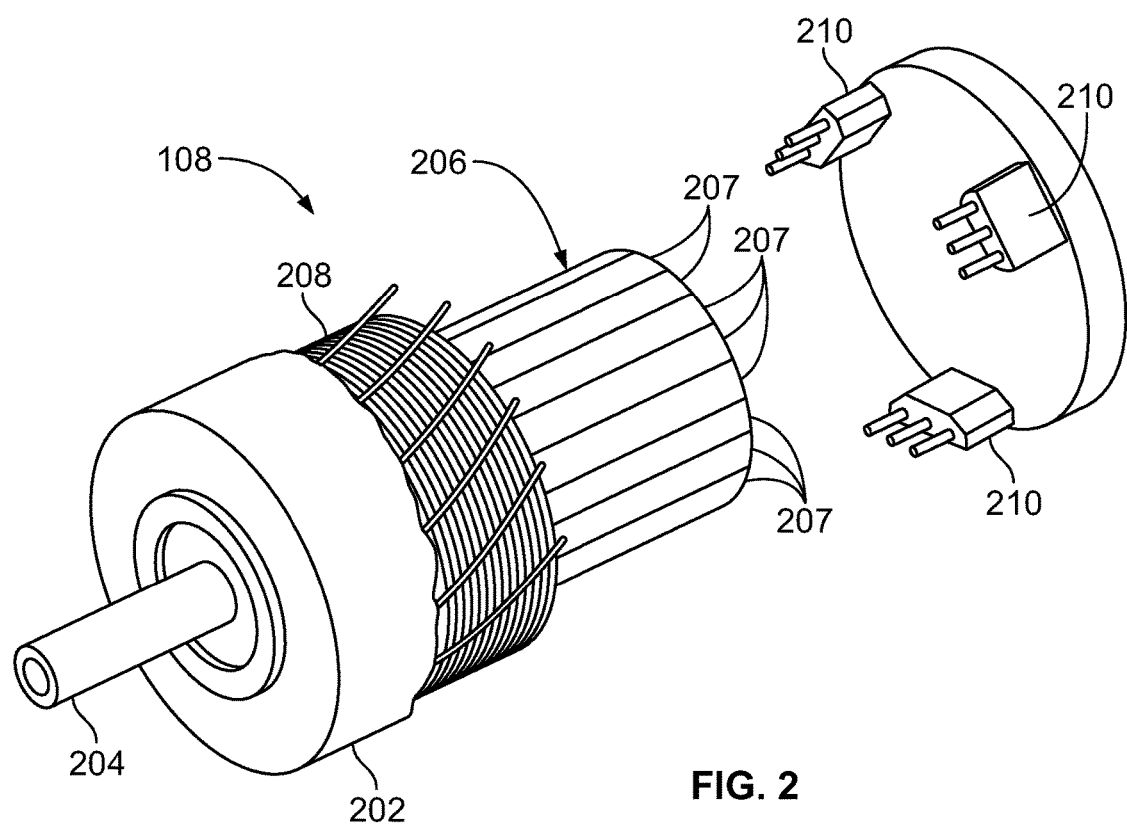
FIG. 2 is an exploded view of a motor according to an embodiment.

Turning to FIG. 2, in an embodiment, the motor 108 includes a casing 202, a shaft 204, rotor 206, a stator 208, and one or more Hall sensors 210. During operation, windings within the stator 208 receive electrical current (e.g., via the cable 116) and generate an electromagnetic field that interacts with the electromagnetic field of one or more permanent magnets 207 on the rotor 206, thereby causing the rotor 206 (and, consequently, the shaft 204) to rotate. As the rotor 206 rotates, the Hall sensors 210 detect the movement of the magnets 207 and generate signals in response to the movement. Logic circuitry of the motor 108 receives the signals from the Hall sensors 210 and generates a position signal in response thereto. The logic circuitry of the motor 108 transmits the position signal to the logic circuitry of the toilet 100. In an embodiment, the motor 108 is a brushless direct current motor.

Figure 3:
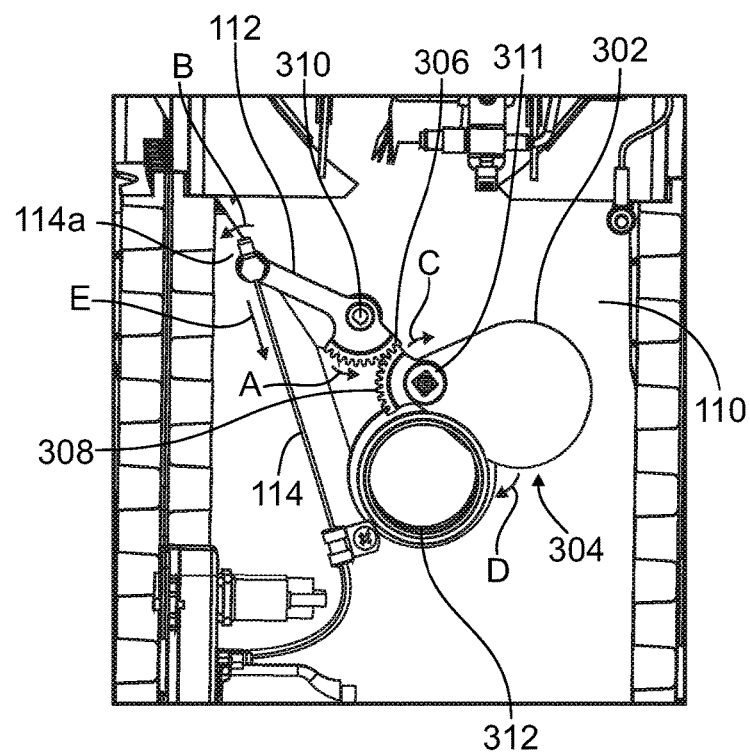
FIG. 3 is a cutaway view of mechanical coupling between the lever, the motor, and the waste outlet door of a toilet system, according to an embodiment.

Turning to FIG. 3, in an embodiment, a door 302 is disposed a slot 304 of the housing 110. The door 302 is coupled to a first mechanical actuator 306 that pivots about a pivot point 310. The mechanical actuator 306 in this example is a first gear (e.g., part of a planetary gear). The first mechanical actuator 306 is attached to the shaft 204 of the motor 108 at the pivot point 310, such that when the shaft 204 rotates (e.g., as the rotor 206 rotates), the first mechanical actuator 306 moves in the direction of arrow A. The lever 112 is attached to the first mechanical actuator 306 such that when the first mechanical actuator 306 moves in the direction of arrow A, the lever 112 moves in the direction of arrow B. Thus, the lever 112 is coupled to the motor 108 via the first mechanical actuator 306. The door 302 is attached to a second mechanical actuator 308 (a second gear in this example) that is coupled to the first mechanical actuator 306. The first mechanical actuator 306 is thus coupled to the door 302 via the second mechanical actuator 308 such that movement of the first mechanical actuator 306 causes corresponding movement of the second mechanical actuator 308 in the direction of arrow C, which moves the door 302 in the direction of arrow D between a fully closed position (as shown in FIG. 4A) in which the door 302 fully blocks the waste outlet 312 of the bowl 102, a partially open (or partially closed) position (as shown in FIG. 4B) in which the door 302 partially blocks the waste outlet 312, and a fully open position (as shown in FIG. 4C) in which the door 302 is fully withdrawn into the slot 304 and does not block the waste outlet 312 at all. The second mechanical actuator 308 pivots about a pivot point 311.

According to an embodiment, the lanyard 114 is positioned such it is manually accessible (i.e., can be accessed by hand by a flight crew member during airborne operation, possibly by opening a cover that surrounds the toilet 100). When the lanyard 114 is pulled in the direction of arrow E, the first end 114*a* pulls the lever 112 in the direction of B, which produces torque on the first mechanical actuator 306 in the direction indicated by arrow A. The first mechanical actuator 306 responds by pivoting at pivot point 310, thereby causing (e.g., by way of the second mechanical actuator 308) the door 302 to move in the direction of arrow D toward a fully closed position. Put another way, the first mechanical actuator 306 and the second mechanical actuator 308 cooperate to transmit motion from the lever 112 to the door 302.

Turning to FIG. 5, in an embodiment, the control box 118 includes logic circuitry 502 that generally controls the operation of the toilet 100, and the motor 108 includes logic circuitry 504 that controls the operation of the motor 108. The logic circuitry 502 communicates with logic circuitry 504 of the motor 108. In an embodiment, when the logic circuitry 502 of the toilet 100 carries out a start-up operation (e.g., upon power-up of the toilet 100), the logic circuitry 502 transmits, to the logic circuitry 504 of the motor 108, a command to put the motor 108 in a zero position. In order to reach the zero position, the logic circuitry 504 causes the rotor 206 to rotate in the appropriate direction and for the appropriate number of revolutions in order to move the door 302 to a predetermined position, such as fully open or fully closed.

Turning to FIG. 6, an example of a process carried out by the logic circuitry 502 of the toilet 100 according to an embodiment will now be described. At block 602, the logic circuitry 502 transmits a control signal to the logic circuitry 504 of the motor 108 to move to a zero position. In response, the motor 108 moves the rotor 206 the appropriate direction and the appropriate number of revolutions to reach the zero position. At some point during further operation of the motor 108, one or more of the Hall effect sensors 210 measure the position of the rotor 206 and report the position to the logic circuitry 504 of the motor 108. The logic circuitry 504 generates a control signal based on the reported position. At block 604, the logic circuitry 502 of the toilet 100 receives a position signal from the logic circuitry 504 of the motor 108. At block 606, the logic circuitry 502 determines, based at least in part on the position signal, whether and how much the motor 108 needs to be operated in order to move the door 302 to the appropriate position. At block 608, the logic circuitry 502 of the toilet 100 transmits a control signal to the logic circuitry 504 of the motor 108 to cause the motor 108 to actuate the first mechanical actuator 306 to move the door 302 to the appropriate position.

Figure 7A:
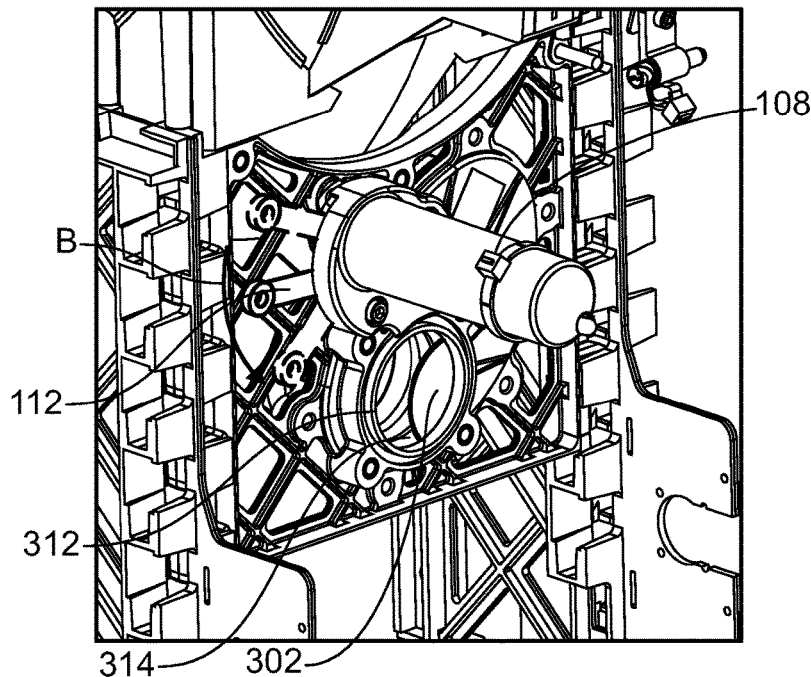

Turning to FIG. 7A (in which the lanyard 114 has been omitted for purposes of showing other features more clearly), the lever 112 can be pulled in the direction of arrow B in order to close the door 302, thereby allowing for manual operation.

Figure 7B:
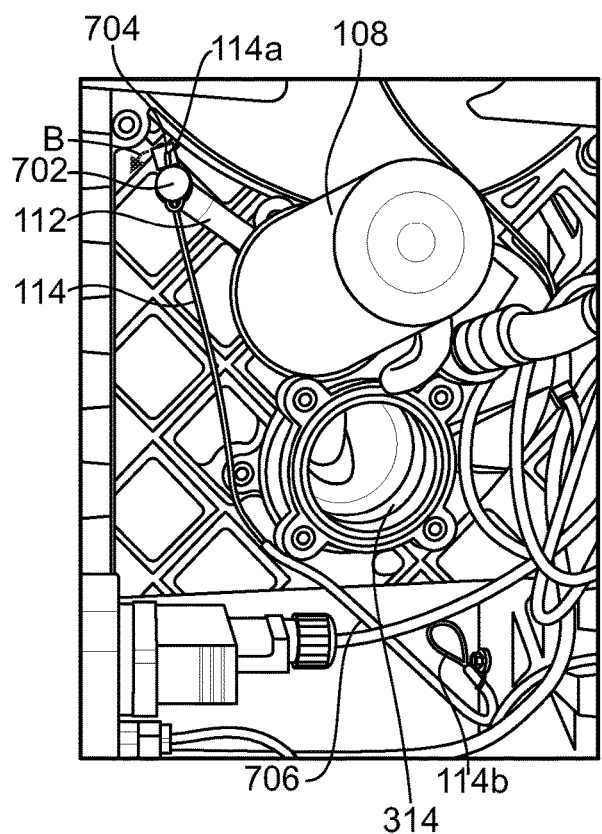
Figure 7C:
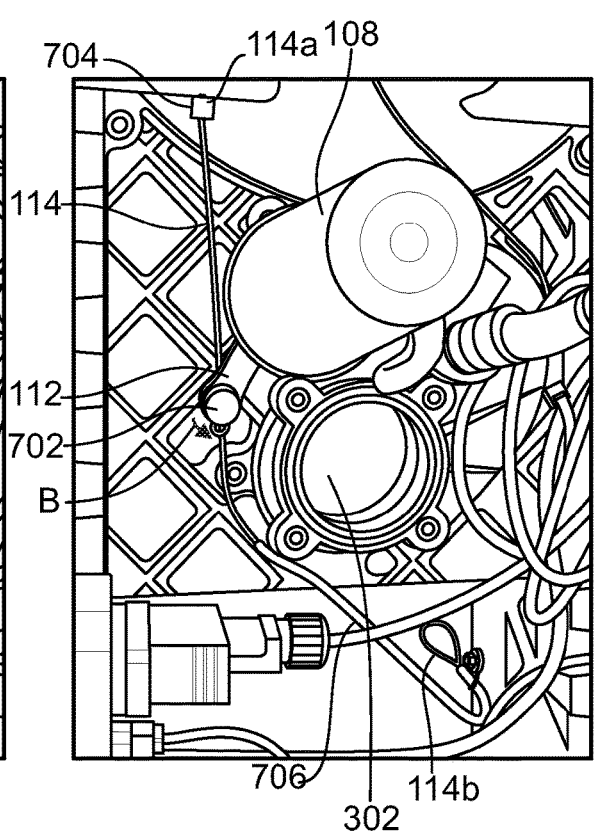
Figure 8:
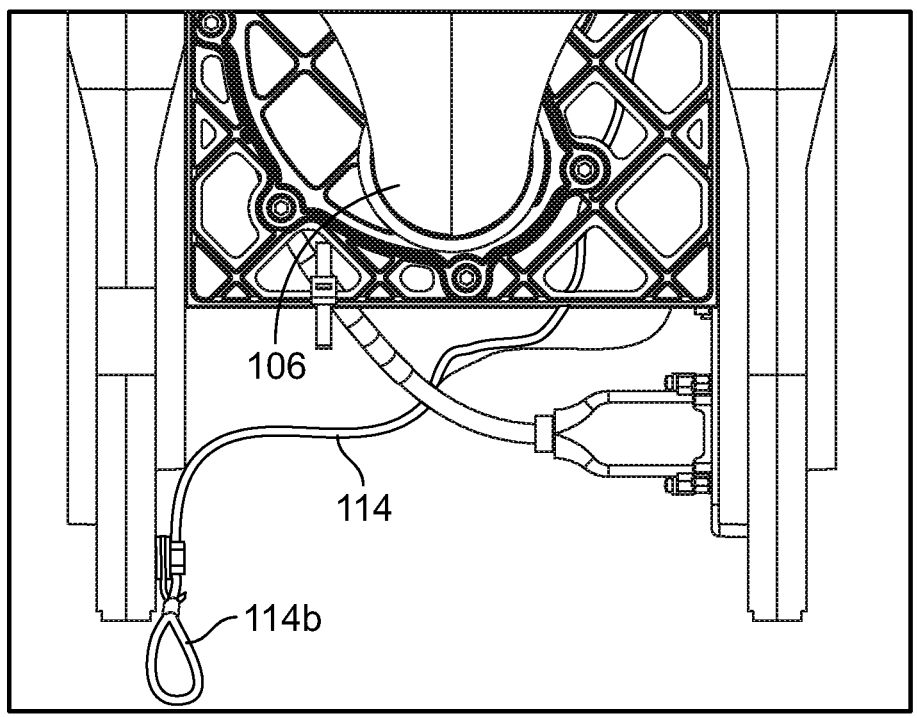

Turning to FIG. 7B and FIG. 7C, according to an embodiment, a bushing 702 is attached to the distal end of the lever 112. The bushing 702 has a hole through which the lanyard 114 passes. Attached the first end 114*a* of the lanyard 114 is a stopper 704 (in the form of, for example, a cap) that does not fit through the hole, such that when the lever 112 moves in the direction of arrow B and the stopper 704 reaches the bushing 702, the stopper 704 catches on the bushing 702 at the hole, thereby allowing the lanyard 114 to pull on the lever 112 (via the stopper 704). In an embodiment, the lanyard 114 is sufficiently stiff so as to generally maintain its orientation as the bushing 702 moves along it. The lanyard 114 may be implemented as a cable made of twisted metal strands. A portion of the lanyard 114 is enclosed by a cover 706 made of, for example, a layer of rubber or plastic, which may be relatively rigid, but through which the lanyard 114 can slide. During normal operation, the bushing 702 slips over the lanyard 114 (i.e., the lanyard 114 passes through the hole in the bushing 702), thereby allowing the lever 112 and corresponding mechanical actuators to move free of significant burden. In various embodiments, this feature may allow the door 302 to be opened and closed without the need for a clutch, while still allowing for manual closure of the door 302 when necessary or when the motor 108 is inoperable (e.g., due to failure or loss of power). As shown in FIG. 8, in an embodiment, the second end 114b of the lanyard 114 is accessible from the front of the frame 104 and may be attached thereto.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail.

The steps of all methods described herein are performable in any suitable order unless otherwise indicated herein or otherwise clearly contradicted by context. The use of any and all examples, or exemplary language (e.g., "such as") provided herein, is intended merely to better illuminate the disclosure and does not pose a limitation on scope unless otherwise claimed. Numerous modifications and adaptations will be readily apparent to those skilled in this art without departing from the spirit and scope of the disclosure.

It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another.

We claim:

1. A method for controlling a waste outlet of a toilet, the toilet comprising a motor, a mechanical actuator coupled to the motor, and a door coupled to the mechanical actuator, the method comprising:
    transmitting a control signal to a first logic circuitry of the motor to move the motor to a zero position;
    detecting, by a Hall effect sensor of the motor, rotation of the motor;
    generating, by the first logic circuitry of the motor, a position signal in response to the detected rotation;
    receiving, by a second logic circuitry, the position signal from the motor;
    determining, by the second logic circuitry based at least in part on the position signal, how much the motor needs to be opened in order to move the door to an appropriate position within the waste outlet; and
    transmitting, by the second logic circuitry, a control signal to the motor to cause the motor to actuate the mechanical actuator to move the door to the appropriate position.

2. The method of claim 1, wherein the appropriate position is a fully open position, the method further comprising:
    receiving an activation signal from a flush mechanism of the toilet; and
    transmitting the control signal in response to the activation signal.

3. An apparatus for controlling a waste outlet of a toilet, the apparatus comprising:
    a lever;
    a mechanical actuator coupled to the lever;
    a door coupled to the mechanical actuator, wherein the door is disposed within the waste outlet of the toilet;
    a lanyard that is coupled to the lever, wherein the lanyard is manually accessible,
    wherein when the lanyard is pulled, the lever moves so as to move the mechanical actuator to move the door.

4. The apparatus of claim 3, further comprising a frame to which the mechanical actuator is attached, wherein an end of the lanyard is attached to the frame.

5. The apparatus of claim 3, wherein the mechanical actuator closes the door.

6. The apparatus of claim 3, wherein the mechanical actuator is a first mechanical actuator, the apparatus comprising a second mechanical actuator that is attached to the door, wherein the first and second mechanical actuators cooperate to transmit motion from the lever to the door.

7. The apparatus of claim 3, further comprising a bushing attached to the lever, wherein the bushing has a hole through which the lanyard passes.

8. The apparatus of claim 7, further comprising a motor, wherein the lever is coupled to the motor such that when the motor imparts torque on the lever, the lever moves and the bushing slides over the lanyard.

9. The apparatus of claim 7, further comprising a stopper attached to an end of the lanyard, wherein the stopper does not fit through the hole, such that when the lanyard is pulled, the lanyard slides through the hole of the bushing until the stopper catches on the bushing at the hole.

10. The apparatus of claim 3, wherein the lanyard includes a cable made of twisted metal strands.

11. The apparatus of claim 3, comprising a cover that encloses a portion of the lanyard.

12. The apparatus of claim 11, wherein the cover is made of rubber or plastic.

13. The apparatus of claim 3, wherein the mechanical actuator is a first mechanical actuator, the apparatus comprising a second mechanical actuator that is attached to the door and coupled with the first mechanical actuator, and the lanyard is attached to an end of the first mechanical actuator opposite the second mechanical actuator.

14. The apparatus of claim 3, wherein the lanyard includes a first end attached to the lever and a second end accessible from a front of a frame of the apparatus.

* * * * *